United States Patent [19]
Puech et al.

[11] 4,433,895
[45] Feb. 28, 1984

[54] INTEGRATED OPTICAL STRUCTURE WITH VELOCITY MATCHED DIRECTIONAL COUPLING

[75] Inventors: Claude Puech; Michel Papuchon; Hervé Arditty, all of Paris, France

[73] Assignee: Thomson-CSF, Paris, France

[21] Appl. No.: 294,557

[22] Filed: Aug. 20, 1981

[30] Foreign Application Priority Data

Aug. 29, 1980 [FR] France ................ 80 18772

[51] Int. Cl.³ ............................................ G02B 5/174
[52] U.S. Cl. ........................... 350/96.13; 350/96.14
[58] Field of Search ............. 350/96.12, 96.13, 96.14, 350/96.11

[56] References Cited
U.S. PATENT DOCUMENTS

| | | | |
|---|---|---|---|
| 4,026,632 | 5/1977 | Hill et al. | 350/96.15 |
| 4,157,860 | 6/1979 | Marcatili | 350/96.14 |
| 4,251,130 | 2/1981 | Marcatili | 350/96.14 |
| 4,372,643 | 2/1983 | Liu et al. | 350/96.14 |

FOREIGN PATENT DOCUMENTS 3006102 8/1980 Fed. Rep. of Germany .
2204813 5/1974 France .

OTHER PUBLICATIONS

Shah, "Fast Acoustic Diffraction-Type Optical Waveguide Modulator," *Appl. Phys. Lett.*, vol. 23, No. 10, Nov. 1973, pp. 556–558.
Schmidt et al., "Acoustooptic Bragg Deflection in LiNbO₃ . . . ," *IEEE J. Quantum Elect.*, vol. QE-11, No. 1, Jan. 1975, pp. 57–59.
Tsai et al., "High-Performance Acousto-Optic Guided-Light-Beam Device . . . ," *Appl. Phys. Lett.*, vol. 26, No. 4, Feb. 1975, pp. 140–142.

*Primary Examiner*—John D. Lee
*Attorney, Agent, or Firm*—Cushman, Darby & Cushman

[57] ABSTRACT

An integrated optical structure creating directional coupling between two waveguides in which an index disturbance accompanying the guided photons is caused to act on two closely-spaced waveguides, this disturbance being produced by a progressive elastic wave with sloping wavefronts emitted by an electromechanical transducer.

15 Claims, 11 Drawing Figures

INTEGRATED OPTICAL STRUCTURE WITH VELOCITY MATCHED DIRECTIONAL COUPLING

BACKGROUND OF THE INVENTION

The present invention relates to integrated optical structures using guided propagation of optical radiation and more particularly to directional couplers. By bringing together over an appropriate length two optical monomode waveguides, an exchange of energy may be observed. The evanescent waves create coupling between the waveguides and it is sufficient for the guided waves to have propagation speeds sufficiently close to one another for a transfer of energy to take place. With lossless waveguides, a total transfer may be achieved which consists in collecting at the output of the second waveguide all the photons injected at the input of the first guide. By taking as basis the electro-optical effect of the material used for constructing the integrated optical structure of a directional coupler, the energy transfer may be controlled electrically. This electric control may assume two aspects according as to whether the electric field is electrostatic in origin or produced by an electromagnetic wave capable of accompanying the photons in their guided progression. When the electric field is stationary, the result of the transfer does not depend on the distribution of the photons so that the energy injected is switched or commutated depending on the electric control voltages applied to the electrodes of the structure. On the other hand, when the control depends on an electromagnetic wave which accompanies the photons in their guided progression, each photon undergoes a fate different from its neighbors, for the directional coupling which concerns it remains velocity matched to an element of the invariable composition conveyed by the electromagnetic wave.

By providing the electric control for a directional coupler formed on an electro-optical substrate by means of a colinear electromagnetic line through which travels a sinusoidal wave, from a continuous light flux there may be obtained an intermittent flux whose pulsations have a duration very much less than those obtained with blocked-mode injection lasers. The provision of velocity matched directional coupling allows light pulse sources to be obtained of very short duration from continuous emission sources. This technique opens the way to time multiplexing-demultiplexing devices which may process signals of a duration less than a picosecond.

The operation of an integrated optical structure using velocity matched directional coupling depends on precise matching of the propagation velocity of the electromagnetic line and that of the guided photons. By appropriately dimensioning the electrodes of the electromagnetic line and by choosing media with suitable dielectric constants a still imperfect structure is obtained, for the manufacturing process introduces errors which it is then difficult to compensate for in order to obtain perfect coincidence of the velocities over a coupling distance of several centimeters.

BRIEF SUMMARY OF THE INVENTION

So as to palliate the disadvantages inherent in using a means for confining the photons based on the electro-optical effect generated by an electromagnetic wave, the invention proposes obtaining the desired confinement by causing elastic waves capable of generating the progessive index disturbance with the desired velocity on waveguide sections reserved for directional coupling.

The invention has as its object an integrated optical structure with velocity matched directional coupling comprising a substrate on the surface of which are arranged two optical waveguides providing an exchange of energy over a predetermined coupling distance, this exchange being governed by control means ensuring along this surface the synchronous propagation of an index disturbance accompanying the guided photons, this disturbance being induced by a progressive wave; said control means comprising an electromechanical transducer emitting said wave; said progressive wave being an elastic surface wave; the obliquity of wavefronts reaching said guides being adjusted so that between said guided photons and said index disturbance synchronous propagation is achieved.

BRIEF SUMMARY OF THE DRAWINGS

The invention will be better understood from the following description and accompanying figures in which.

DESCRIPTION OF THE PREFERRED EMBODIMENTS

Figure 1:
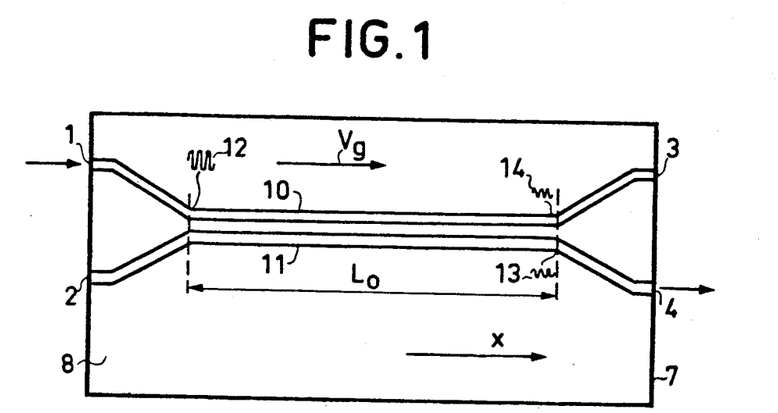
FIGS. 1 and 2 are explanatory diagrams.

In FIG. 1 there can be seen the structure of a directional coupler such as it may be constructed by integrated optics. This coupler comprises a substrate 7, made for example from lithium niobate, on the surface 8 of which are formed two diffused regions 10 and 11 for guiding optical radiations exchanged between channels 1-3 and 2-4. The index variation required for guiding the light may be obtained by depositing a layer of titanium on surface 8. By a photolithographic process, the layer of titanium is removed, except straight above waveguides 10 and 11, and an operation for diffusing the deposited titanium in the lithium niobate is proceeded with. After removal of the remaining titanium, two diffused strips are obtained surrounded by media having a lower index. By giving to these diffused bands adequate diffusion width and depth, two integrated monomode waveguides are obtained.

In order to obtain an exchange by directional coupling, the waveguides 10 and 11 are brought close to one another in a section of length $L_o$ which corresponds to the desired coupling distance.

If a photon 12 of a given wavelength is injected into channel 1, it propagates at group velocity $V_g$ in the waveguide 10. The photon 12, while being propagated, may exchange a greater or smaller part of its energy with structure of waveguide 11. The energy exchange takes place through evanescent waves in the closely-spaced section of waveguides 10 and 11 where they are parallel to axis x. The theoretical study of directional coupling makes use of the notion of a coupling coefficient c which is determined from refraction indices, from the width, the depth and the spacing apart of waveguides 10 and 11 in the exchange section. This theory shows that the total transfer of the energy takes place if the waveguides are without losses and if the propagation velocities have equal values. There exists then a minimum coupling distance $L_o$ which, in the case of equality of the group velocities, ensures total energy transfer between channels 1 and 4. Uneven multiple distances of this distance give the same result.

If $\beta_1$ and $\beta_2$ are respective phase constants of the waves traveling in guides 10 and 11, the difference $\Delta\beta = \beta_2 - \beta_1$ is zero if the geometric characteristics of the guides are the same and if their respective refraction indices $n_1$ and $n_2$ are equal. At the end of distance $L_o$, the ratio I of the energy coupled into channel 4 to the energy injected into channel 1 is equal to unity.

Assuming that there is created in the waveguides a differentiation of the indices $n_1$ and $n_2$, the difference $\Delta n = n_2 - n_1$ implies a difference of the phase constants $\Delta\beta$. The theory then shows that the energy transfer ratio I depends on the ratio $\Delta\beta/2c$. For a coupling length l, the ratio I may be put in the form:

$$I = \frac{1}{\frac{\Delta\beta^2}{4c^2} + 1} \sin^2 c.l. \sqrt{\frac{\Delta\beta^2}{4c^2} + 1}$$

Knowing that the total transfer takes place when: $c.l. = (2k' - 1)\pi/2$ where k' is a positive whole number, we have:

$$I = \frac{1}{\frac{\Delta\beta^2}{4c^2} + 1} \sin^2 \frac{\pi}{2} \sqrt{\frac{\Delta\beta^2}{4c^2} + 1}$$

Figure 2:
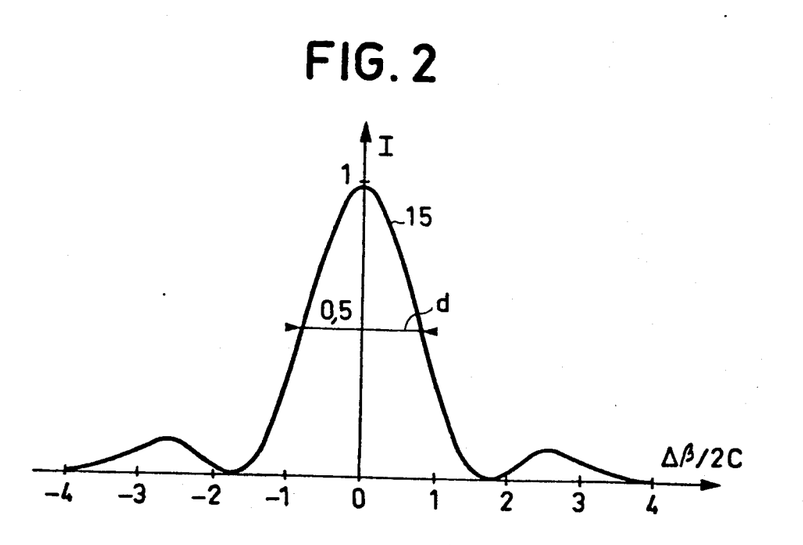

This mathematical expression is illustrated by the curve 15 in FIG. 2; it is nothing more than the function $(\sin \alpha/\alpha)^2$ often met with in optics.

FIG. 2 shows that the energy transfer may be modulated so as to obtain a distribution effect and at the extreme a switching effect between channels 3 and 4. This modulation may be conceived statically or kinetically. It relates to the index variation $\Delta x$ which may be induced by an electro-optical effect and/or by any other effect such as the photoelastic effect.

Within the scope of the present invention, the index variation $\Delta n$ is in the form of a disturbance which accompanies the progression of the guided photons. This disturbance which is propagated at the group velocity $V_g$ presents about a zero value index variations $\Delta n$ sufficient to cancel out the transfer ratio I. Thus the photon occupying the position of this zero value undergoes total transfer, whereas its neighbors which all along the coupling distance $L_o$ see a nonzero $\Delta n$, undergo a lesser transfer determined by the diagram of FIG. 2. This kinetic conception of the modulation of the energy transfer in a directional coupler has been proposed for structures using an electro-optical material. In this case, the index disturbance is induced by an electromagnetic line which straddles the directional coupler. The TEM mode propagated by the electromagnetic line must have a phase velocity which coincides all along the coupling section with the group speed $V_g$. This condition is difficult to satisfy in practice, for the reduction in velocity required for obtaining phase matching causes serious manufacturing difficulties at the level of the electromagnetic line.

The technique for forming integrated circuits by photolithography allows at present rectilinear outlines of several centimeters to be obtained whose alignment errors are of the order of a tenth of the wavelength used for the interferometric checking of the translations. This high precision may be used for generating an index disturbance with a wave whose propagation velocity is much smaller than the group velocity $V_g$ of the guided photons. Thus, with an effective index $n_e = 2.3$, the group velocity $v_g$ is the order of $1.3 \times 10^8$ m/s. To create an index disturbance matched in phase to this velocity, the use of acoustic waves may be contemplated having a phase velocity $v_a$ between $2.10^3$ and $5.10^3$ m/sec.

Figure 3:
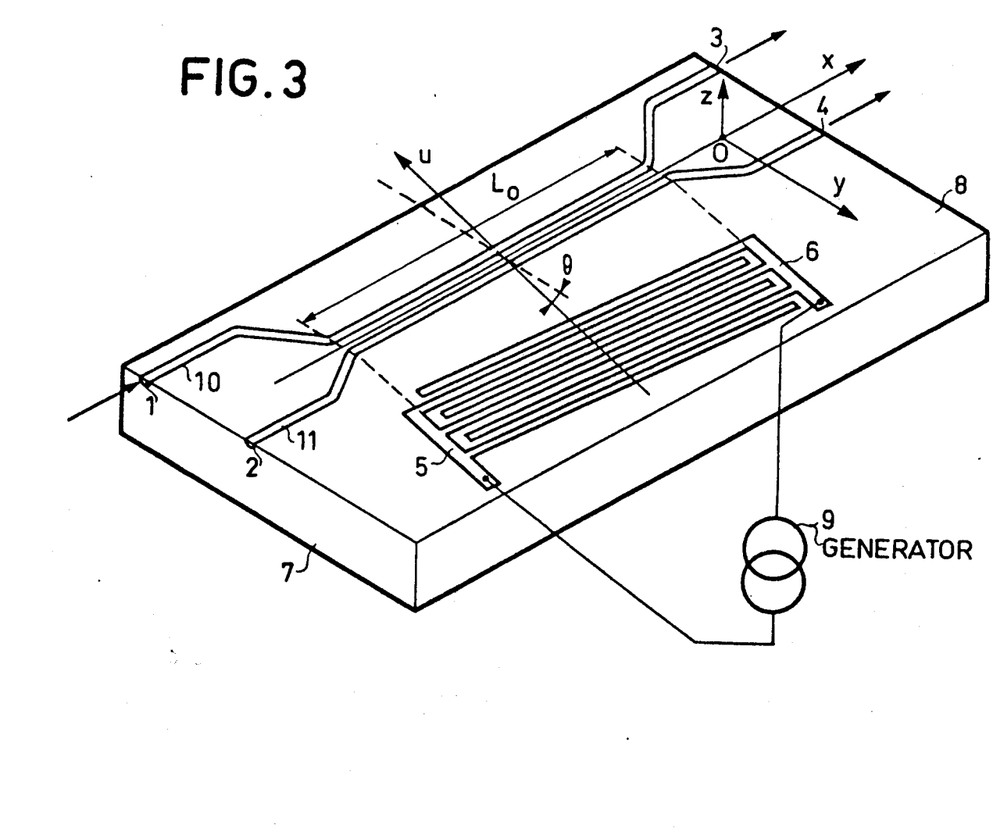
FIG. 3 is an isometric view of an integrated optical structure in accordance with the invention.

FIG. 3 shows an integrated optical structure in accordance with the invention.

It comprises for example a lithium niobate substrate 7, flush with the surface 8 of which are provided two monomode waveguides 10 and 11 obtained by localized diffusion of titanium. The coupling section of length $L_o$ is aligned with the axis ox of a cartesian reference system oxyz. The plane of surface 8 is the plane oxy in which are emitted surface elastic waves whose wavefronts have as normal the direction U forming the angle $\theta$ with the direction parallel to the axis oy. The emission of the surface elastic waves is provided by an electromechanical transducer energized by an electric generator 9. This transducer comprises for example two electrodes 5 and 6 in the form of interdigited combs. The configuration of the waveguides 10 and 11 as well as that of electrodes 5 and 6 may be defined with extreme accuracy by photolithography. Elastic wavefronts may then meet the waveguides with a very small obliquity which maintains its value over a great coupling length $L_o$. In FIG. 3, the spacing apart of waveguides 10 and 11 has been greatly exaggerated as well moreover as the slope $\theta$ of the teeth of transducer 5, 6.

Figure 4:
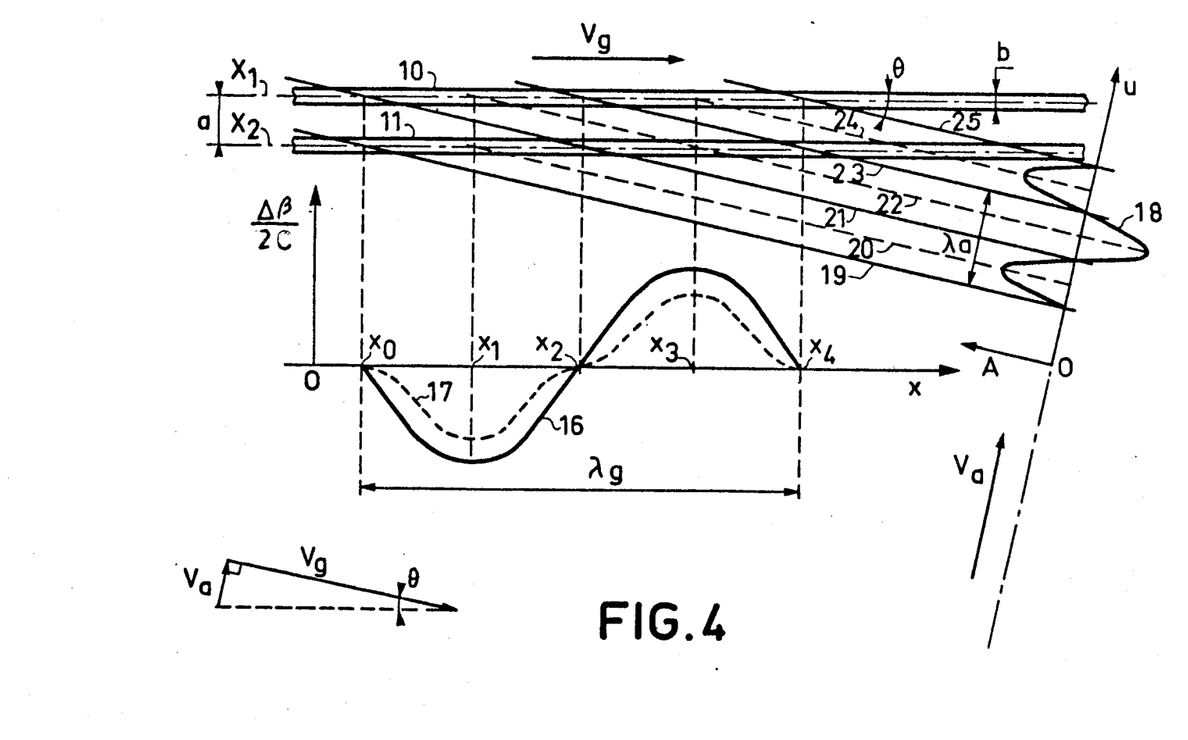
FIG. 4 is an explanatory diagram.
Figure 5:
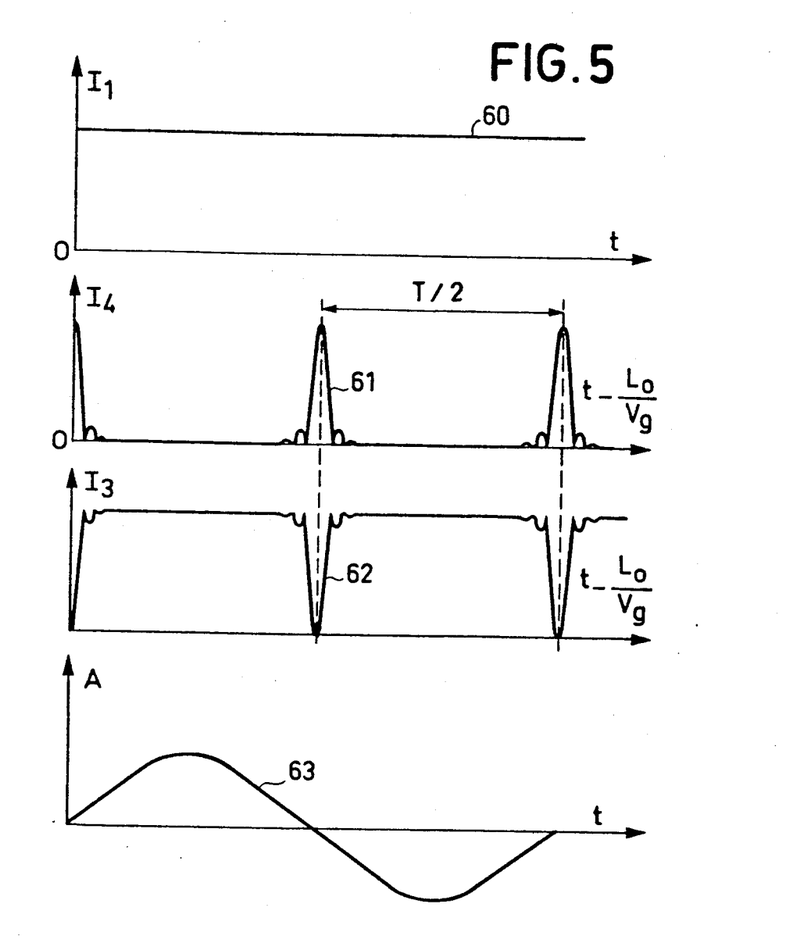
FIG. 5 illustrates the energy confinement produced by the device of FIG. 3.

The operating mode of the structure of FIG. 3 may be better understood with the help of FIGS. 4 and 5.

FIG. 4 shows at a given time the configuration of the mechanical stresses imposed by the surface elastic wave in the plane of surface 8. It may be mentioned in passing that the surface elastic wave may be for example a Rayleigh wave, but it may also be an interface wave. The axes $X_1$ and $X_2$ of the two guides 10 and 11 are spaced apart by a distance a and their width b is less than a. The surface elastic wave is shown by wavefronts 19, 20, 21, 22, 23, 24 and 25 which meet axes $X_1$ and $X_2$ with a slope $\theta$. The diagram A,u shows the mechanical stress variation produced by the elastic wave. In the case of FIG. 4, this stress develops sinusoidally as is shown by curve 18. This wave progresses at an acoustic velocity $v_a$ measured perpendicularly to the wavefront.

The slope $\theta$ is chosen so that the apparent velocity of the elastic wave along axis $X_1$ or $X_2$ of the waveguides coincides with the group velocity $v_g$ of the guided photons. We have then the relationship: $v_a = v_g \sin \theta$.

Considering the very low value of the ratio $v_a/v_g$, we may write: $v_a/v_g = \theta$ with $\cos \theta = 1$.

In the simple case where equal variations Δn of opposite signs affect lines 10 and 11 at an abscissa $x_1$, the wavefronts 20 and 22 which correspond to maximum stresses +A and −A are moved aside by $\lambda_a/2$ or in general by $(2k-1)\lambda_a/2$, k being any positive whole number. The result is that at abscissa $x_0$, $x_2$ and $x_4$, the total index variation 2Δn is zero and that at abscissa $x_1$ and $x_3$ it is respectively negatively and positively maximum. By using as parameter the magnitude $\Delta\beta/2c$ of FIG. 2, there is shown in FIG. 4 the disturbance of the optical phase constant with respect to x. The sinusoidal curve 16 relates to infinitely thin waveguides (b=0) and broken-line curve 17 to real waveguides (b≠0). Knowing that $\lambda_g$ is the spatial period of the disturbance and that $\lambda_a$ is the acoustic wavelength, we have:

$$\lambda_a/\lambda_g = \theta \text{ and } a=(2k-1)\lambda_a/2.$$

The photons which occupy the abscissa $x_0$, $x_2$ and $x_4$ undergo total transfer, but the intermediate photons are less and less transferable the further away from these abscissa. Taking into account the variation law of FIG. 2, the trend may be given for the radiation intensities collected in channels 3 and 4 of the directional coupler when it receives in channel 1 continuous radiation.

FIG. 5 shows by curve 60 the incident power $I_1$ on channel 1 of the directional coupler. The stress A imposed by the surface elastic wave is shown by curve 63. These two curves are plotted with the same time scale t as reference. The powers $I_3$ and $I_4$ collected in channels 3 and 4 are shown by curves 62 and 61 which are complementary. Curves 61 and 62 have been plotted by taking $(t-L_o/v_g)$ for the time scale, for the transmission delay $L_o/v_g$ over the coupling distance $L_o$ is taken into account.

The power in channel 4 is in the form of pulses having the profile of FIG. 2. The narrowness of these pulses is all the greater, the greater the index gradient about abscissa $x_0$, $x_2$ and $x_4$. The period of the pulses is equal to half the period of the acoustic surface wave.

The pulse train collected in channel 4 forms a periodic function whatever the coupling length chosen. However, to achieve total transfer length $L_o$ must be suitably chosen.

The operating characteristics may then be resumed by the following relationships:

$$v_a/v_g = \theta \tag{1}$$

$$T = \frac{\lambda_a}{v_a} = \frac{2a}{(2k-1)v_a} \tag{2}$$

$$L_o = \frac{(2k'-1)\pi}{2c} \tag{3}$$

where k and k' are positive whole numbers.

By way of nonlimiting example, in the particular case where k and k' are equal to unity, with a lithium niobate substrate and guides obtained by diffusion of titanium, the effective index $n_e$ is equal to 2.3, which gives group velocity $v_g = 1.304 \cdot 10^8$ m/sec. Elastic surface waves having a velocity $v_a = 3500$ m/sec lead to a slope $\theta$ equal to 0.0000268 radian.

For a coupling length $L_o$ of 10 cm, providing total transfer with a spacing a=7.7 μm, the wavelength of the elastic waves will be $\lambda_a = 15.4$ μm.

The energization frequency of the electromechanical transducer $f_a$ is equal to 227 MHz.

The interval between two coupled pulses in channel 4 is about 2.2 ns.

Considering a sinusoidal variation of the amplitude index Δn and referring to the diagram of FIG. 2, the duration $\tau$ related to the half-power width d may be calculated. This duration has for value:

$$\tau = \frac{0.8}{4\pi\Delta n} \frac{\lambda_o}{L_o} T$$

where $\lambda_o$ is the wavelength of the optical radiation in a vacuum. In the case of monochromatic radiation, this duration has a defined value.

In the example cited, with $\lambda_o = 1$ μm, $n = 10^{-3}$, we find a duration of 2.8 picoseconds. Since the width of the guides is not zero, the trend of the variation of $\Delta\beta/2c$ is not quite sinusoidal, resulting in stretching of the duration $\tau$. However, by using an elastic wave of frequency 2.6 GHz, pulses may be obtained of a duration equal to a fraction of a picosecond.

Figure 6:
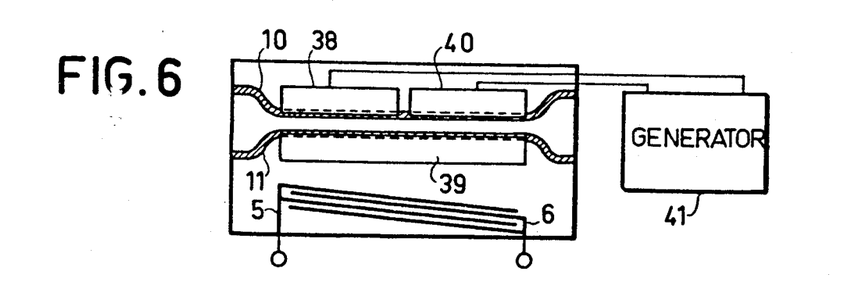
FIG. 6 shows a first variation of the device of FIG. 3.

The directional coupler of FIG. 3 allows the electrical adjustment of the total transfer length to be envisaged. To this end, electrodes may be added as shown in FIG. 6. Guide 11 is covered over the whole coupling length by a first electrode 39, whereas guide 10 is covered half and half by two electrodes 38 and 40. A generator 41 supplies to electrodes 38 and 40 an adjustable biasing voltage. By electro-optical effect, this voltage influences the phase constants so as to provide total transfer.

The preceding relationship (1) gives the slope $\theta$ of the wavefronts with respect to the waveguides. This slope is small in value since, with the figures given above, we find $\theta = 0.0000268$ rad, i.e. a variation in level of only 2.68 microns for 10 cm length.

This variation in level is within the scope of present photolithographic techniques, for the delimitation of the waveguides and of the comb teeth may be achieved with extreme accuracy.

Figure 7:
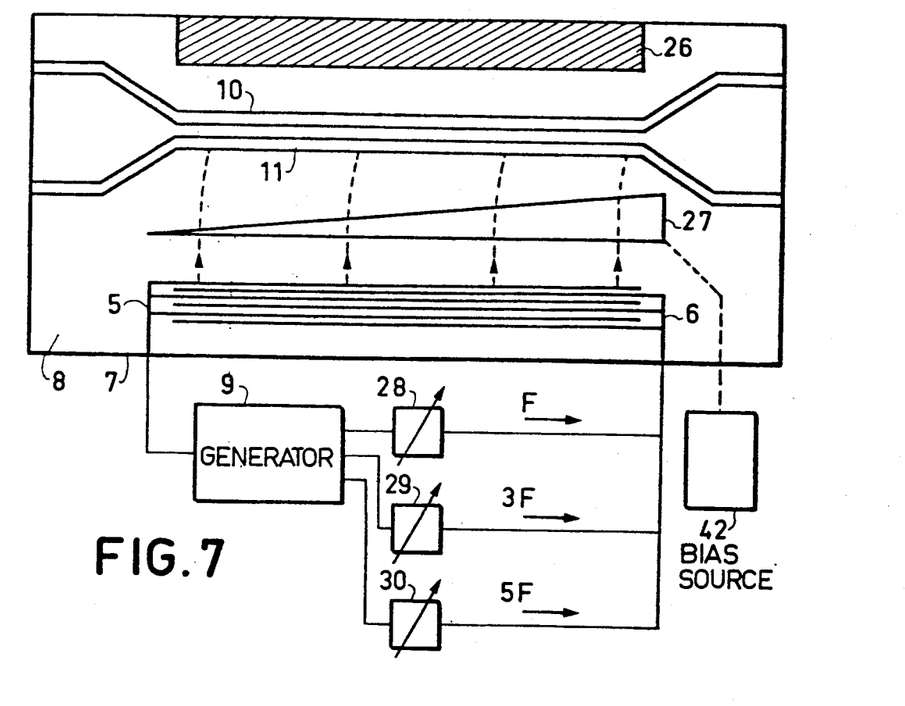
FIG. 7 shows a second variation of the device of FIG. 3.

However, so as to obtain the desired slope of the wavefronts, a deflecting area may be advantageously used. This solution is illustrated by FIG. 7 which shows a transducer 5-6 whose comb teeth are orientated parallel to the rectilinear sections of waveguides 10-11. Means 27 for deflecting the elastic surface waves are inserted between transducer 5-6 and the directional coupling section 10-11. As deflecting means, a prismatic zone may be used hollowed out like a basin so as to provide geodesic-type refraction. A triangular layer may also be deposited which, by short-circuiting the electric field or by mass effect, modifies the phase velocity of the elastic surface waves. The structure of the substrate may be further modified by ionic bombardment or an electrode may be provided which in connection with a biasing source 42 introduces a phase shift due to the nonlinearity of the piezoelectric tensor of the material forming the substrate.

The absorption of the elastic surface waves may be provided by a layer of absorbing material 26 placed downstream of the directional coupler. Another improvement illustrated in FIG. 7 consists in supplying transducer 5-6 with several voltages of frequencies F, 3F, 5F. Adjusting circuits 28, 29 and 30 allow these voltages to be adjusted in amplitude and in phase so as to obtain on meeting the waveguides 10 and 11 an index variation with a steep front. This steep front variation reduces the duration of the coupled pulses.

Figure 8:
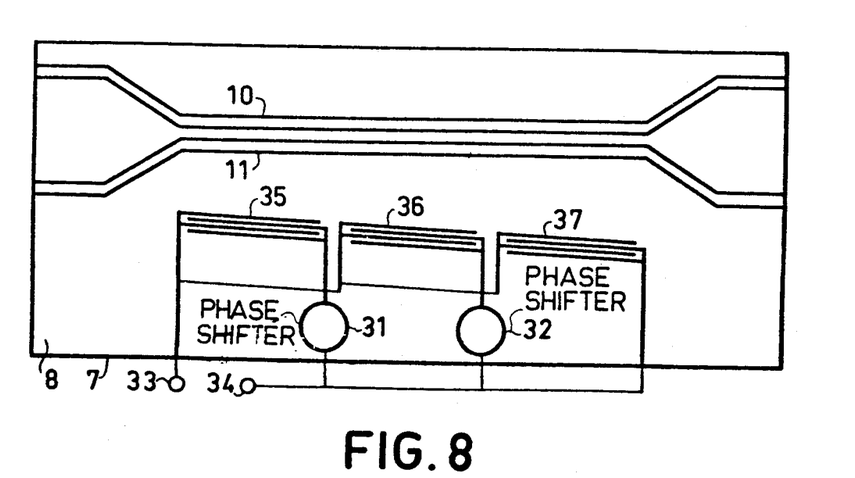
FIG. 8 shows a third variation of the device of FIG. 3.

FIG. 8 shows that the electromechanical transducer may be split up into several sections 35, 36 and 37. By supplying these sections via phase-shifting circuits 31 and 32 connected to the supply terminals 33 and 34, slight deformations may be obtained of the radiated wavefront so that its slope $\theta$ proves the phase-tuning condition. The phase-shifting circuits 31 and 32 may be advantageously formed by connections of an adjustable length deposited on substrate 8.

Figure 9:
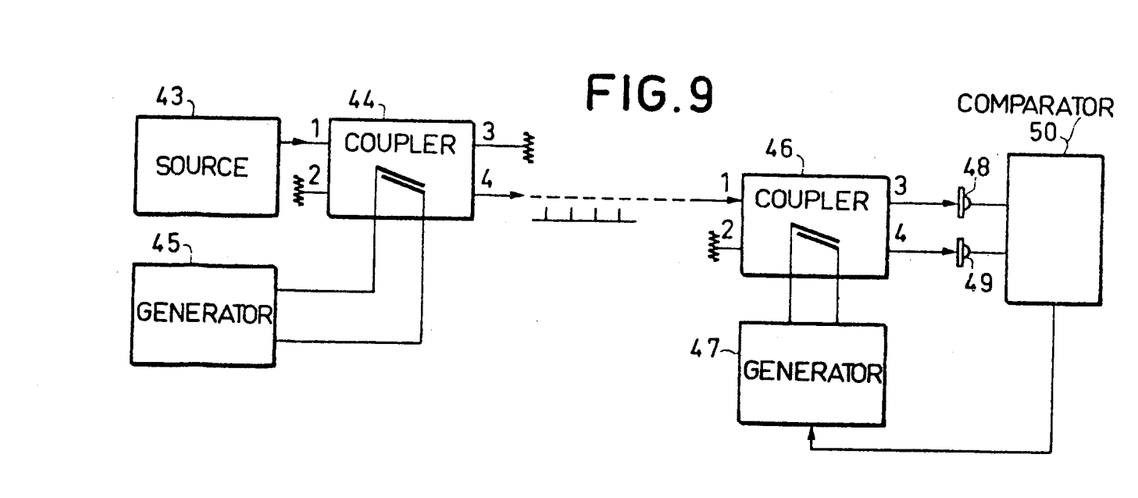
FIG. 9 shows the diagram of an optical pulse system using structures in accordance with the invention.

In FIG. 9, there can be seen an optical pulse system using two directional couplers. A monochromatic continuous-radiation source 43 is coupled to channel 1 of the directional coupler 44. This coupler is placed under the control of an alternating generator 45 which supplies an electromechanical transducer. Channel 4 of coupler 44 delivers ultrashort pulses at a frequency double that of generator 45. The pulses delivered by the directional coupler 44 are applied to channel 1 of a directional coupler 46 having a structure identical to that of coupler 44. Channels 3 and 4 of coupler 46 are connected to radiation detectors 48 and 49 which supply the two inputs of a comparator circuit 50. Coupler 46 is placed under the control of an alternating generator 47 with adjustable tuning. The comparator circuit 50 controls the frequency tuning of generator 47. If we consider generator 45 as a primary clock and if generator 47 represents a secondary clock, the system of FIG. 9 allows frequency and phase locking of the two clocks to be achieved. The comparator circuit 50 elaborates a tuning signal depending on the transfer ratio measured by the two detectors 48 and 49. The locking of clock 47 takes place when channel 4 of coupler 46 delivers only the pulses injected into channel 1. A new tuning adjustment is initiated by the comparator circuit 50 when the total transfer towards channel 4 deteriorates.

Figure 10:
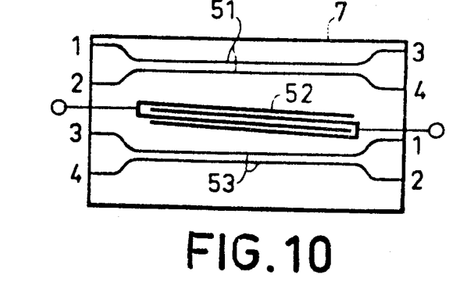
FIG. 10 shows a fourth variation of the device of FIG. 3.

The invention is not limited to the case where a single directional coupler is placed on the path of the elastic waves. In FIG. 10, two directional coupler structures 51 and 53 may be seen placed on each side of an electromechanical transducer 52. The teeth of transducer 52 are sloping with respect to the rectilinear sections of the two couplers 51 and 53. In the case of FIG. 10, the waveguides are all parallel; the numbering of the channels shows the direction in which the coupling takes place. Several directional couplers may be provided on each side of the electromechanical transducer 52. Conversely, a directional coupler may be irradiated by the elastic waves coming from several transducers arranged on substrate 7. By causing these transducers to operate alternately and by suitably choosing the slope of the wavefronts, it is possible to obtain directional coupling in both traveling directions.

The invention is not limited to transducers formed of interdigited comb electrodes deposited on a piezoelectric substrate.

In fact the previously-described interaction does not imply that substrate 7 is piezoelectric and that it is made of an electro-optical material.

Figure 11:
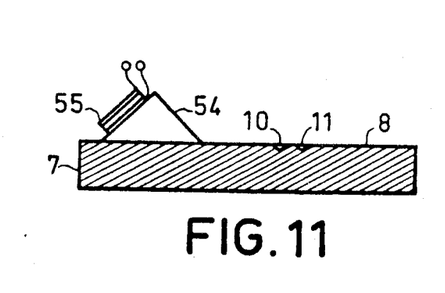
FIG. 11 shows a fifth variation of the device of FIG. 3.

In FIG. 11, a directional coupling device may be seen in which the elastic waves are emitted by an electromechanical transducer 55 emitting longitudinal or transverse waves. A coupling prism 54 matches the velocity of the waves emitted by transducer 55 to that of the elastic waves propagated by surface 8.

In the preceding description, the only imperative condition is that the slope $\theta$ of the elastic wavefronts should confirm the relationship:

$$\theta = v_a/v_g$$

To make the explanation of operation easier, it has been assumed up to now that two photons having the same position along the coupler must undergo the same zero disturbance so as to achieve maximum transfer. This condition is not imperative.

The general study shows that when the condition $\lambda_a = 2a/(2k-1)$ is not confirmed for a positive whole value of k, pulses are obtained in channel 4 which are not evenly spaced apart in time and which becomes wider.

The width of the pulses is given by the relationship:

$$\tau = \frac{0.8 \lambda_o}{4\pi L_o} \cdot \left(\frac{T}{\Delta n}\right) \cdot \frac{1}{\sin \frac{\pi a}{\lambda_a}}$$

In particular, the factor $1/(\sin \pi a/\lambda_a)$ is equal to unity when k is equal to a positive whole number. On the other hand, this factor tends towards infinity if k is equal to half an uneven number.

This latter formula shows that the width $\tau$ of the pulses may be modulated by causing the amplitude or the frequency of the elastic wave to vary. When the frequency varies, the pulses cease to be isochronic.

What is claimed is:

1. An integrated optical structure with velocity matched directional coupling comprising:
   a substrate,
   two optical waveguides on the surface of said substrate providing an exchange of energy over a predetermined coupling distance, and
   an electromechanical transducer emitting a progressive, elastic surface wave inducing the synchronous propagation of an index disturbance accompanying the guided photons,
   the obliquity of wavefronts reaching said waveguides being adjusted so that synchronous propagation is achieved between said guided photons and said index disturbance.

2. The structure as claimed in claim 1, wherein the half-wavelength of the elastic surface wave is an uneven submultiple of the spacing between said waveguides.

3. The structure as claimed in claim 1, wherein said transducer is a transducer formed from two interdigited electrodes in the form of combs; said substrate comprising a piezoelectric material on which said electrodes rest.

4. The structure as claimed in claim 3, wherein said substrate is formed by lithum niobate; said waveguides being obtained by diffusion of titanium.

5. The structure as claimed in claim 1, wherein said substrate comprises several directional couplers.

6. The structure as claimed in claim 1, wherein said substrate comprises a plurality of electromechanical transducers.

7. The structure as claimed in claim 1, wherein said elastic surface wave is a sinusoidal wave.

8. The structure as claimed in claim 1, wherein said transducer is energized by an alternating signal and the uneven rank harmonics thereof.

9. The structure as claimed in claim 1, wherein wavefront deflecting means are inserted between said transducer and said guides.

10. The structure as claimed in claim 1, further comprising means for the electric adjustment of the coupling length.

11. The structure as claimed in claim 1, wherein said transducer comprises an alignment of elementary transducers supplied by phase adjustment circuits.

12. The structure as claimed in claim 1, wherein said coupling distance ensures total transfer.

13. The structure as claimed in claim 1, wherein the half-wavelength $\lambda_a$ of said elastic surface wave is chosen different from an uneven submultiple of the spacing between said guides so that the coupled pulses have a duration increased in the ratio $1/\sin(\pi a/\lambda_a)$.

14. An optical pulse-train transmission system; comprising at least one structure as claimed in claim 1, said transmission system comprising means for generating pulses associating with said structure a continuous emission radiation source.

15. The system as claimed in claim 14, wherein said source emits monochromatic radiation.

* * * * *